United States Patent [19]
Gottmann et al.

[11] Patent Number: 5,279,839
[45] Date of Patent: Jan. 18, 1994

[54] BAKERY PRODUCTS AND INTERMEDIATES

[75] Inventors: Klaus Gottmann, Heppenheim; Bruno Sproessler, Rossdorf, both of Fed. Rep. of Germany

[73] Assignee: Röhm GmbH, Darmstadt, Fed. Rep. of Germany

[21] Appl. No.: 811,814

[22] Filed: Dec. 20, 1991

[30] Foreign Application Priority Data

Dec. 22, 1990 [DE] Fed. Rep. of Germany ....... 4041533

[51] Int. Cl.$^5$ ............................................. A21D 8/04
[52] U.S. Cl. ........................................ 426/20; 426/61; 426/62; 426/63; 426/64; 426/549
[58] Field of Search ................... 426/20, 61, 62, 63, 426/64, 549

[56] References Cited

U.S. PATENT DOCUMENTS 5,082,672  1/1992  Hamada et al. ...................... 426/7

FOREIGN PATENT DOCUMENTS 0246554  11/1987  European Pat. Off.
0310460  4/1989  European Pat. Off.

OTHER PUBLICATIONS

Patent Abstracts of Japan, vol. 15, No. 56, Feb. 8, 1991, 99 C 804, JP-A 2-286031.
Kirk-Othmer, Encyclopedia of Chemical Technology, 3rd Edition, vol. 3, John Wiley & Sons, New York pp. 438–449.
Pyler, Baking Science and Technology, vol. II, Siebel Publishing Co., Chicago, pp. 898–903.

*Primary Examiner*—Joseph Golian

[57] ABSTRACT

Transglutaminase, when added to flours or baking agents, preferable in combination with a protease or ascorbic acid, improves the resistance of dough to stretching, particularly of yeast doughs made from wheat flour.

14 Claims, No Drawings

BAKERY PRODUCTS AND INTERMEDIATES

The present invention relates to an improvement in the field of baking technology, and more particularly to improved baking agents, flours, doughs, and baked goods, as well as to improved methods for making doughs and baked goods.

In baking technology, particularly in the preparation of yeast-risen goods from weak wheat flour, the dough often has an unsatisfactory stability, which produces to a dough which has too little resistance to lifting and which is not able to retain the carbon dioxide gas which forms on dough fermentation (rising). Breads having slight porosity (lift) and low volume result. This phenomenon is attributed to the protein properties of the flour, the so called gluten. It is known and was generally common, e.g. in the United States, to add potassium bromate to the flour to improve the resistance to stretching (cf. Y. Pomeranz, *Wheat Chemistry and Technology*, The Association of Cereal Chemists, St. Paul, Minn., USA (1971) p. 700.

Because of the effort to reduce the addition of chemicals to foodstuffs and instead to use natural auxiliaries, the problem arose of improving the resistance of doughs without the addition of inorganic chemicals.

It has now been found that transglutaminase improves the resistance of doughs, particularly yeast doughs from wheat flour, in a manner comparable to potassium bromate. The addition of transglutaminase is unobjectionable from the point of view of toxicology and the laws governing food additives because it is a natural digestible protein.

Transglutaminase is an enzyme accessible from various sources that is widespread in the animal and plant kingdoms. It can be obtained from the liver of guinea pigs (cf. J. E. Folk and P. W. Cole, Journal of Biological Chemistry, 241, 1966, p. 5518 ff). For commercial purposes, recovery is from cultures of microorganisms, e.g. from cultures of mold fungi (cf. Tomita et al., Agric. Biol. Chemistry, 52(2), 1988, pp. 1159-1163). A method for introducing the transglutaminase gene into the genome of a microorganism is described by K. Ikura (cf. Europ. Journal of Biochemistry, 187, 1990, pp. 705-711). Microorganisms transformed in this way can be used for the commercial production of transglutaminase.

It is known that transglutaminase has a crosslinking effect on proteins. Presumably its effect on the rheological properties of dough according to the present invention has some connection to this capability. However, the addition of transglutaminase for such a purpose has never been considered. Only the improvement of the technological properties of protein fodders with transglutaminase has been proposed by G. Matheis and J. R. Whitaker in the Journal of Food Biochemistry, 11, 1987, pp. 309-327 (312).

The activity of a transglutaminase preparation can be determined according to J. E. Folk and P. W. Cole, Biochem. Biophys. Acta, 122, 1966, p. 244, by a colorimetric hydroxamate test using benzoxy-carbonyl-glutaminyl-glycine-hydroxylamine as a substrate at pH 6 and 37° C. The colorimetric determination is carried out at a wave length of 525 nm. One enzyme unit is the amount of transglutaminase which liberates 0.5 micromol of hydroxamate per minute. Transglutaminase preparations having an activity of at least 100 units per gram, preferably 1000 to 10,000 units per gram, are particularly useful for the invention.

The need for transglutaminase for improvement of the stretching properties depends in individual cases on the nature of the flour. As a rule it is in the region of 100 to 10,000, preferably 500 to 2000, units per kilogram of flour. Based on the protein content of the flour, an addition of 500-20,000 units per kilogram is meaningful. If the transglutaminase is added as a component of a baking agent, then it is preferably present therein in an amount of 10,000 to 1 million units per kilogram of the agent.

The transglutaminase can be added in different ways in the preparation of baked goods. A commercial enzyme preparation can be used as such together with the remaining components for the preparation of dough. However, it can also be mixed with the flour at the mill, which has the advantage that the dosage can be conformed to the properties of the flour, i.e. to its natural gluten properties, so that a flour of invariant baking properties can always be supplied to the baker. Thus, transglutaminase is preferably added to weak wheat flours to strengthen gluten properties.

The transglutaminase can also be mixed with other conventional additives into a baking agent which the baker adds together with flour, water, and yeast, or other conventional raising agents for the preparation of dough. As components of baking agents, other enzymes in addition to transglutaminase, such as amylases, proteases, and hemicellulases, as well as ascorbic acid, baking emulsifiers, salt, sugar, or flour are contemplated. Thus, "baking agents" according to the invention include mixtures of transglutaminase with at least one of the aforementioned components, wherein the concentration of this enzyme is in a range which is greater than the content necessary in the dough.

The baking emulsifiers contained in the baking agents do not form any sharply defined group. By this term are to be understood materials which promote the homogeneity of the dough, in which they have a wetting (surfactant) effect on the dough components and improve their compatibility. The emulsifier molecule is comprised of a non-polar, lipophilic, hydrophobic portion and a polar, hydrophilic or lipophobic portion. A comprehensive overview of emulsifiers as additives for foodstuffs is given by Gregor Schuster and Wolfgang Adams in a series of articles appearing in 1979-1985 in the Zeitschrift für Lebensmittel-Technologie und Verfahrenstechnik. Above all, in practice the esters of edible fatty acid mono- and di-glycerides with diacetyl tartartic acid, as well as lecithin and lysolecithin, are of outstanding significance.

The effect of transglutaminase on the dough can be followed in an extensogram. In addition to the desired increase in the dough resistance, a lessening of extensibility is sometimes observed, which leads to an earlier breakage of the dough when testing extensibility. It has been found that this undesired side effect can be excluded by combining transglutaminase with a protease. Further, volume of baked goods is increased and their crumb properties are improved by the use of a protease.

As proteases, papain or bacterial proteases can be used, for example. Neutral fungal proteases are preferred, especially of mold fungus cultures such as *Asp. niger* or *Asp. oryzae*. These have a high dosage tolerance. The ratio of protease to transglutaminase is best determined empirically by the effect on the dough extensibility using an extensograph.

The effect of transglutaminase is increased by ascorbic acid. With a certain ratio of transglutaminase to ascorbic acid, that point in time at which low dough viscosity, suitable for kneading, transforms into a high viscosity which is advantageous for crumb properties can be determined.

The doughs prepared according to the invention using transglutaminase can be worked up into high quality bakery products under conventional conditions. Wheat bread, rolls, and variety breads are representative.

The efficacy of the addition of transglutaminase according to the invention is demonstrated by the following tests and test bakings, given by way of illustration.

Doughs with and without enzyme addition are prepared in a farinograph. The amount of water necessary for dough preparation is determined in this way. After a standing time of 135 minutes at 30° C., the resistance to stretching and the extensibility are measured. Even if an increase in the resistance to stretching is the most important goal of the invention, extensibility may not at the same time decrease disproportionately. The optimum ratio of resistance to stretching to extensibility is in the range from 2.5 to 3.0. Further, a high tolerance is sought for in the dough, which can be recognized by the energy value determined by an extensogram. The energy value is determined from the area under the curve of the extensogram.

The extensograms were prepared according to the standardized AACC Method 54-10 of the American Association of Cereal Chemists, Inc., St. Paul, Minn., USA. The results are given in Table 1.

Baking Tests

Batches each containing 1000 g of wheat flour (type 550), 590 ml of water, 50 g of yeast, 15 g of salt, 10 g of sugar, and 10 g of peanut oil were kneaded in a Universal-Speedkneader (A. Stephan and Sons, Hameln, Fed. Republic of Germany) with the baking additives indicated in Table 2 for 1 minute at Stage 1 (1400 rpm) at 26°-27° C. The dough was kept at 32° C. and 80% relative humidity for 20 minutes in a proof box, then plumped up into a round and kept 10 minutes at 20°-22° C. Then each dough batch was divided into 30 pieces which, after a short intermediate rising (3 minutes on the work surface), were left to rise at 32° C. for 25 minutes in a fermentation cabinet. A further rising of the pieces at 20°-22° C. with air circulation followed. Then the pieces were put in an oven preheated to 250° C. After vigorous steam injection, baking followed for about 20 minutes. The results are reported in Table 2.

TABLE 1

| Dough Property | Dough Properties | | |
|---|---|---|---|
| | No Enzyme | 2000 U Transglutaminase/kg Flour | 2000 U Transglutaminase and 0.3 g Fungal Protease*/kg Flour |
| Water Uptake (in %) | 54.1 | 54.2 | 54.1 |
| Dough Resistance (EE) | 230 | 510 | 400 |
| Extensibility (mm) | 182 | 120 | 170 |
| Ratio of Resistance/Extensibility | 1.3 | 4.25 | 2.35 |
| Energy (cm$^2$) | 80 | 75 | 122 |

*Mold fungus protease ["Veron PS", (R) Röhm GmbH]

TABLE 2

| No. | Additive/kg Flour | Bake results | | |
|---|---|---|---|---|
| | | Dough Quality | Baked Volume ml/10 rolls | Crumb Porosity |
| 0 | None | soft | 1850 | open |
| I | 500 U Transglutaminase | woolly, solid | 2000 | fine |
| II | 2000 U Transglutaminase | solid, short | 1750 | dense, solid |
| III | 2000 U Transglutaminase + 0.3 g Protease* | woolly | 2200 | fine |
| IV | 500 U Transglutaminase + 0.02 g ascorbic acid | woolly, solid | 2100 | fine |
| V | 1000 U Transglutaminase + 0.1 g Amylase** + 0.2 g Hemicellulase*** | woolly, solid | 2300 | fine |

*fungal protease ["Veron PS", (R) Röhm GmbH]
**fungal amylase ["Veron AC", (R) Röhm GmbH]
***fungal hemicellulase ["Veron HE", (R) Röhm GmbH]

What is claimed is:

1. A flour composition for yeast-raised baked goods, said composition comprising bread flour and an amount of transglutaminase effective to increase the stretching resistance of dough made from said flour composition.

2. A flour composition as in claim 1 wherein said bread flour is wheat flour.

3. A flour composition as in claim 1 which additional contains ascorbic acid in an amount effective to increase the effect of the transglutaminase.

4. A flour composition as in claim 1 wherein the amount of transglutaminase present is from 100 to 10,000 units per kilogram of bread flour.

5. A flour composition as in claim 1 which additionally contains a protease in an enzymatic amount effective to combat a possible decrease in the extensibility of dough made from said flour composition caused by transglutaminase present in the dough.

6. A method for making a yeast-raised dough which comprises combining bread flour, water, yeast, and conventional baking agents including transglutaminase as at least one baking enzyme, the amount of transglutaminase being effective to increase the stretching resistance of the dough.

7. A method as in claim 6 wherein said dough also contains ascorbic acid in an amount effective to increase the effect of the transglutaminase.

8. A method as in claim 6 wherein the amount of transglutaminase present is from 100 to 10,000 units per kilogram of flour used in making the yeast-raised dough.

9. A method for making yeast-raised baked goods which comprises baking a yeast-raised dough as in claim 6.

10. A method as in claim 6 wherein said dough also contains a protease in an enzymatic amount effective to combat a possible decrease in the extensibility of the dough caused by transglutaminase present in the dough.

11. A baking agent for yeast-raised baked goods, said agent containing a backing emulsifier in an amount promoting the homogeneity of dough containing said baking agent and transglutaminase as at least one baking enzyme therein, the amount of transglutaminase being effective to increase the stretching resistance of yeast-raised dough containing said baking agent.

12. A baking agent as in claim 11 which also contains a protease in an enzymatic amount effective to combat a possible decrease in the extensibility of dough including said baking agent caused by transglutaminase present in the dough.

13. A baking agent as in claim 11 wherein the amount of transglutaminase is from 10,000 to 1 million units per kilogram of baking agent.

14. A baking agent as in claim 11 which also contains ascorbic acid in an amount effective to increase the effect of the transglutaminase.

* * * * *